UNITED STATES PATENT OFFICE.

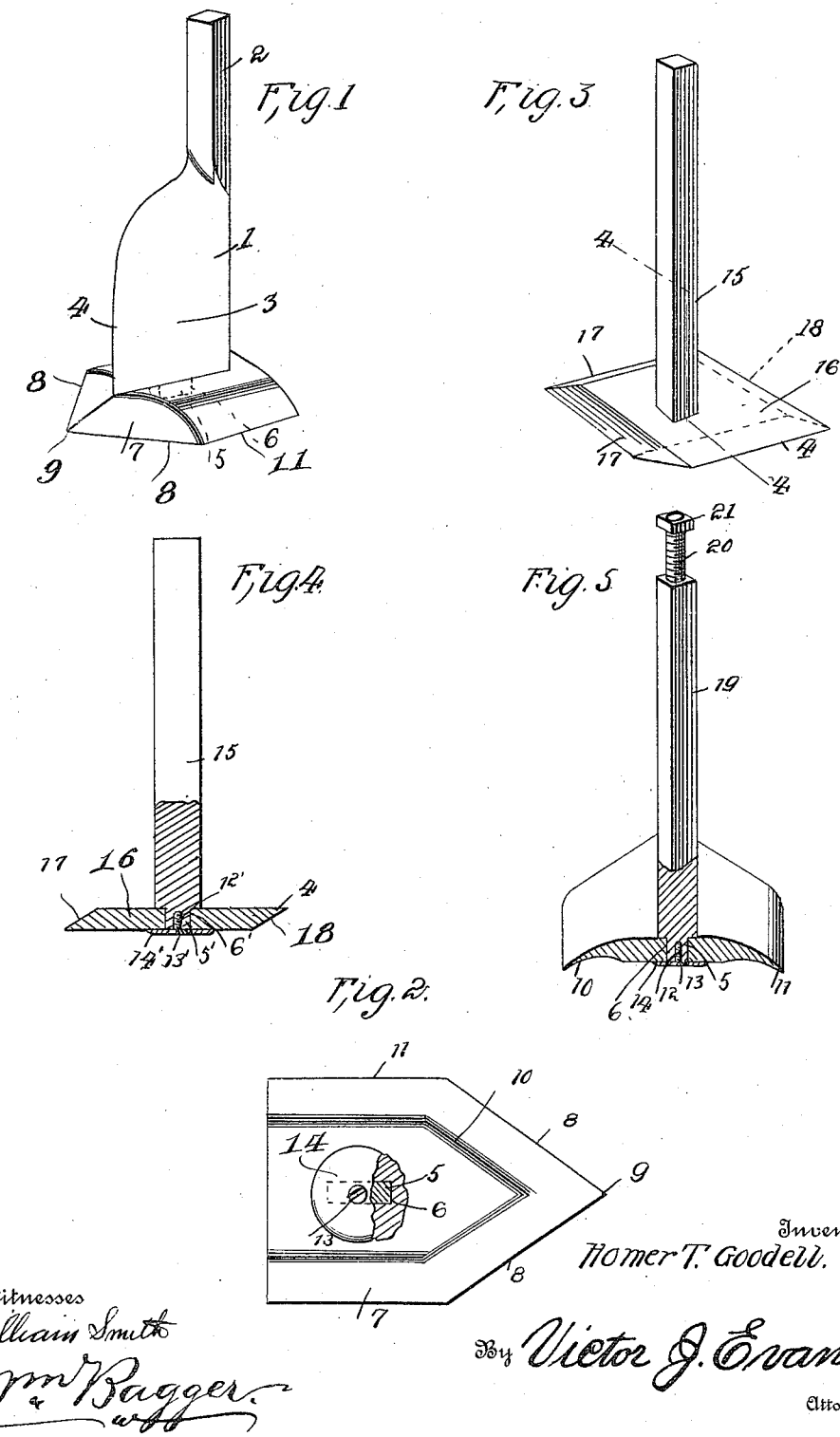

HOMER T. GOODELL, OF PHILBROOK, MONTANA.

HARROW-TOOTH.

985,582.

Specification of Letters Patent. Patented Feb. 28, 1911.

Application filed April 15, 1910. Serial No. 555,722.

*To all whom it may concern:*

Be it known that I, HOMER T. GOODELL, a citizen of the United States of America, residing at Philbrook, in the county of Fergus and State of Montana, have invented new and useful Improvements in Harrow-Teeth, of which the following is a specification.

This invention relates to harrow teeth, and it has for its principal object to provide a harrow tooth with a subsoil attachment for the purpose of severing the roots of weeds and other plants in order to exterminate the same and also in order to more efficiently loosen and pulverize the soil.

With these and other ends in view, which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications may be made within the scope of the claims when desired.

In the drawing,—Figure 1 is a perspective view illustrating one form of the invention. Fig. 2 is a bottom plan view of the same. Fig. 3 is a perspective view illustrating a slightly modified form of the invention. Fig. 4 is a vertical sectional view taken on the line 4—4 in Fig. 3. Fig. 5 is a perspective view illustrating a further modification, whereby the invention may be applied to wooden-frame harrows.

Corresponding parts in the several figures are denoted by like characters of reference.

The harrow tooth 1, shown in Fig. 1 of the drawings, has a shank 2 of non-circular cross section adapted to be readily applied by customary clips or clamping means to a metallic frame harrow. The tooth has a broad cutting blade 3 presenting a sharp cutting edge 4 to the front and a tenon 5 projects downwardly from the blade, said tenon engaging a mortise 6 in the sub-soiling blade 7, which latter consists of a plate of suitable thickness having side edges 8 that converge forwardly and terminate in a point 9. The bottom side of the blade 7 has a recess or cavity 10, whereby side flanges 11 are formed, the same being beveled to present sharp cutting edges. The tenon 5 is provided with a screw threaded recess or socket 12 for the reception of a fastening member, such as a screw 13, the head of which is countersunk in a washer 14, which latter is preferably beveled in a direction of its circumference, so that it will present no obstruction upon the underside of the blade which is partially overlapped by said washer, whereby in connection with the screw 13 it is firmly secured in position for operation.

Under the construction illustrated in Figs. 3 and 4 the shank here designated 15 is substantially square in cross section, and the sub-soiling blade 16 is likewise substantially square, the shank and blade being disposed to present corners in a forward direction to readily engage the soil. The blade 16 has a mortise 6' for the reception of a tenon 5' depending from the shank, said tenon having a threaded socket 12' for the reception of a fastening screw 13', the head of which is countersunk in a washer 14', thereby securing the blade in position upon the shank in a manner corresponding with that illustrated in Figs. 1, 2 and 5. The forwardly presented edges of the blade 16 are beveled upon their upper sides, as shown at 17, and the opposite edges are beveled upon the underside of the blade, as shown at 18, thus presenting double cutting edges and enabling the blade to be reversed when desired.

In Fig. 5 of the drawings the shank, here designated 19, has an upwardly extending reduced screw threaded portion 20 to engage with a nut 21 whereby the device may be connected with the frame of a wooden harrow. The shank and the cutting blade may be of either of the constructions previously described. It will be understood that the construction of blade described in connection with Fig. 1 is also shown in Fig. 5 of the drawings.

It is obvious that the improved harrow tooth when connected with a suitable frame will dig into the soil and that the sub-soiling blade will not only pulverize and agitate the soil, but that it will be very efficient to cut the roots of weeds which may thus be exterminated.

Having thus described the invention, what is claimed as new, is:—

1. A harrow tooth including a shank having a tenon of non-circular shape provided with a screw threaded recess, a sub-soiling blade having a correspondingly shaped aperture engaging the tenon, a washer placed against the underside of the blade and overlapping the exposed end of the tenon, and a connecting screw having a head countersunk in the washer.

2. A harrow tooth including a shank having a tenon provided with a screw threaded recess, a sub-soiling blade having forwardly and rearwardly converging oppositely beveled edges, and fastening means including a screw and a washer for separably assembling the parts.

In testimony whereof I affix my signature in presence of two witnesses.

HOMER T. GOODELL.

Witnesses:
CLARENCE M. GOODELL,
MILLIE C. GOODELL.

---

Copies of this patent may be obtained for five cents each, by addressing the "Commissioner of Patents, Washington, D. C."